(12) United States Patent
Kayukawa

(10) Patent No.: US 6,952,957 B2
(45) Date of Patent: Oct. 11, 2005

(54) TRANSMITTER IN TIRE CONDITION MONITORING APPARATUS

(75) Inventor: Hisashi Kayukawa, Mino (JP)

(73) Assignee: Pacific Industrial Co., Ltd., Gifu-ken (JP)

( * ) Notice: Subject to any disclaimer, the term of this patent is extended or adjusted under 35 U.S.C. 154(b) by 0 days.

(21) Appl. No.: 10/680,575

(22) Filed: Oct. 7, 2003

(65) Prior Publication Data

US 2004/0119584 A1 Jun. 24, 2004

(30) Foreign Application Priority Data

Dec. 24, 2002 (JP) ........................................ 2002-373010

(51) Int. Cl.⁷ ............................................... B60C 23/02
(52) U.S. Cl. ..................................................... 73/146.8
(58) Field of Search ................................. 73/146, 146.2, 73/146.3, 146.4, 146.5, 146.8; 701/1

(56) References Cited

U.S. PATENT DOCUMENTS

| | | | |
|---|---|---|---|
| 2,866,658 A | * 12/1958 | Cummings | .................. 251/293 |
| 5,080,575 A | * 1/1992 | Berg et al. | ................... 425/564 |
| 5,183,069 A | * 2/1993 | Berg et al. | ................ 137/15.18 |
| 5,844,131 A | 12/1998 | Gabelmann et al. | |
| 6,055,855 A | 5/2000 | Straub | |
| 6,375,158 B1 | * 4/2002 | Kramer et al. | ............... 251/337 |
| 2004/0034454 A1 | * 2/2004 | Ito et al. | ......................... 701/1 |

FOREIGN PATENT DOCUMENTS

JP    2000-81358    3/2000

* cited by examiner

Primary Examiner—Edward Lefkowitz
Assistant Examiner—Andre Allen
(74) Attorney, Agent, or Firm—Crompton, Seager & Tufte, LLC

(57) ABSTRACT

A transmitter has a valve stem, an electronic element, a casing and a coupler. The valve stem permits flow of air into the tire. The electronic element transmits a data representing the condition of the tire. The casing accommodates the electronic element. The coupler couples the valve stem to the casing such that an angle of the casing relative to the valve stem is adjustable be controlled. This can be attached to wheels having different cross-sectional shape.

9 Claims, 3 Drawing Sheets

TRANSMITTER IN TIRE CONDITION MONITORING APPARATUS

BACKGROUND OF THE INVENTION

The present invention relates to a wireless tire condition monitoring apparatus that permits a driver in a vehicle passenger compartment to check the conditions of tires, such as the air pressure. More specifically, the present invention relates to a transmitter in a tire condition monitoring apparatus.

Some transmitters for tire condition monitoring apparatus have a valve stem that is formed integrally with a casing and functions as a transmission antenna. The casing accommodates electronic elements for transmitting data, which data represents the condition of a tire. Such a casing includes a flange extending outward from the bottom and triangular reinforcing ribs between the flange and the outer surface of the casing. Therefore, when the tire is replaced, the tire beads are overlaid on the casing. Therefore, the tire is replaced without damaging the casing (Japanese Laid-Open Patent Publication No. 2000-081358).

However, the construction disclosed in the publication cannot be applied to all the types of vehicle wheels. That is, there are many different types of cross-sectional shapes in wheels. The cross-sectional shapes in wheels include a deep rim, a shallow rim, a wide flat rim, and wide deep rim. Therefore, the angle defined by a valve stem and a casing is determined by the cross-sectional shape of a wheel. As a result, to attach a casing to a drop center of a wheel, a valve for a transmitter in a tire condition monitoring apparatus must correspond to the cross-sectional shape of the wheel.

SUMMARY OF THE INVENTION

Accordingly, it is an objective of the present invention to provide a transmitter in a tire condition monitoring apparatus, which valve can be attached to wheels having different cross-sectional shape.

To achieve the above object, the present invention provides a transmitter. The transmitter has a valve stem, an electronic element, a casing and a coupler. The valve stem permits flow of air into the tire. The electronic element transmits a data representing the condition of the tire. The casing accommodates the electronic element. The coupler couples the valve stem to the casing such that an angle of the casing relative to the valve stem is adjustable be controlled.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A transmitter in a tire condition monitoring apparatus according to one embodiment will now be described with reference to the drawings.

Figure 1:
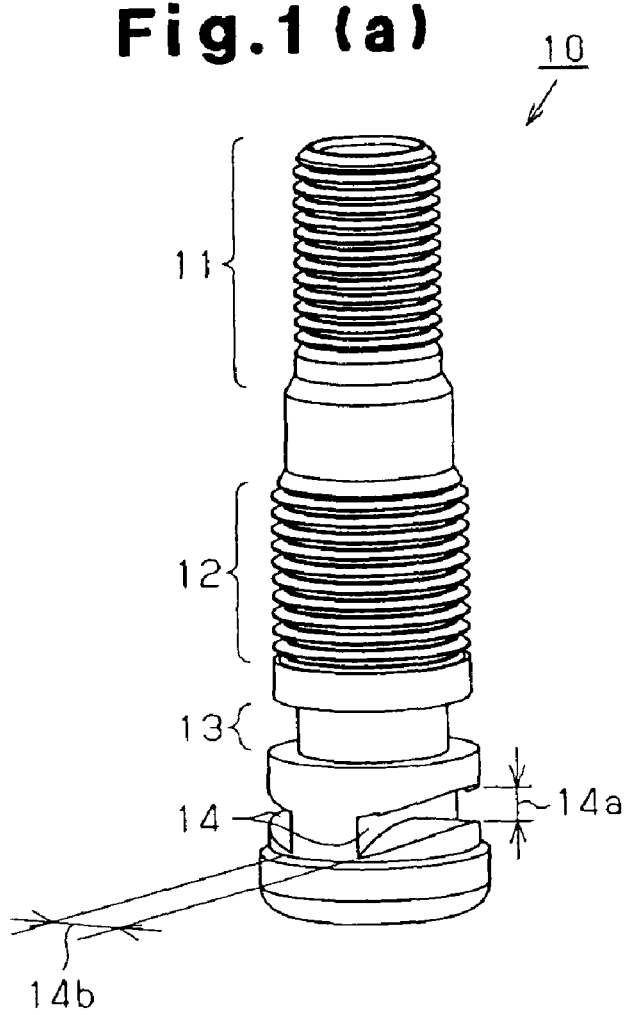
FIG. 1(a) is a perspective view illustrating a valve stem.
FIG. 1(b) is a perspective view illustrating an odd shaped washer.
FIG. 1(c) is a perspective view illustrating a housing member.
Figure 1:
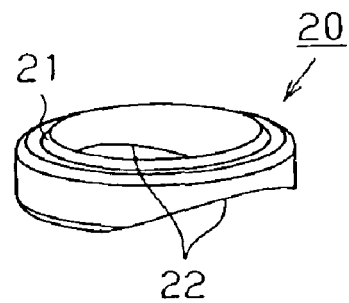
Figure 1:
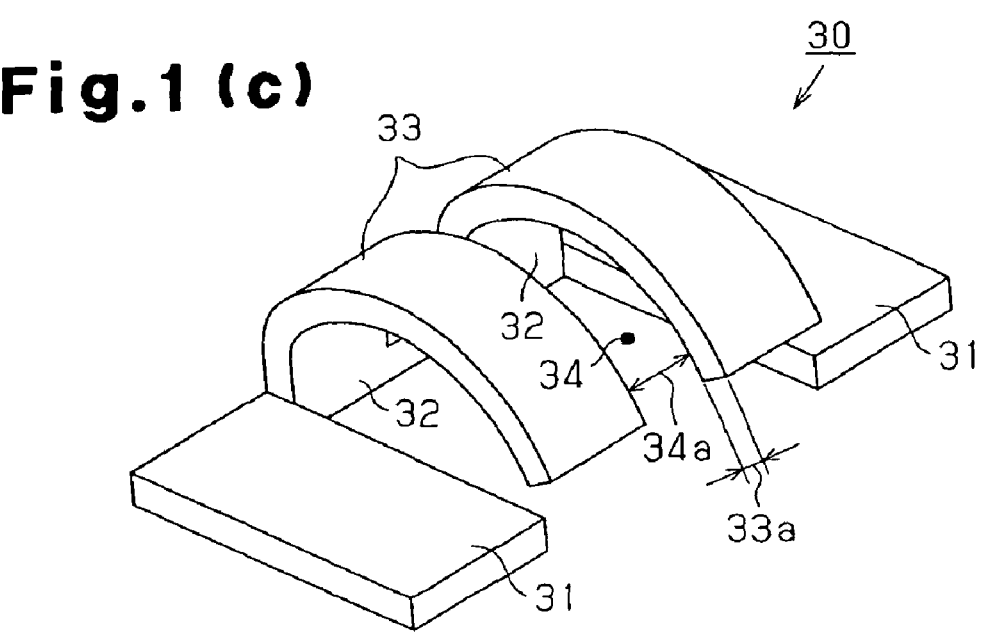

As shown in FIG. 1(a), a valve stem 10 has a threaded cap receiving portion 11 and a threaded fixing portion 12 for fixing the valve stem 10 to a wheel. The diameter of the cap receiving portion 11 is less than the diameter of the fixing portion 12. An engaging groove 13 is formed at a portion below the fixing portion 12. Below the engaging groove 13, that is, at a lower portion of the valve stem 10 that is embedded in a tire, a pair of arcuate grooves 14. A through hole for filling the tire with air extends through the valve step 10. An air valve is provided in the through hole.

As shown in FIG. 1(b), an odd shaped washer 20 has an circular projecting edge 21 at an upper inside circumference. A pair of arcuate recesses 22 are formed at the lower part of the odd shaped washer 20. The radius of curvature of the recesses is substantially the same as the grooves 14 shown in FIG. 1(a).

As shown in FIG. 1(c), a coupler, which is a housing member 30, has a pair of flat plate portions 31, rising portion 32, and a pair of arcuate projections 33. The flat plate portions 31 are fixed to a casing 40 (see FIG. 3) that accommodates electronic elements. The rising portion 32 is located between the flat plate portions 31. The projections 33 extend from the rising portion 32. The radius of curvature of the projections 33 is substantially the same as the arcuate recesses 22 shown in FIG. 1(b). The thickness of the projection 33 is substantially the same as an axial size 14a of the grooves 14. A space 34 having an open end is defined between the projections 33. A width 34a of the space 34 is substantially the same as the distance 14b between the grooves 14.

A procedure for attaching a transmitter in the tire condition monitoring apparatus to a wheel 2 will now be described. The casing 40 for accommodating electronic element has been fixed to the flat plate portions 31 of the housing member 30 through insert molding in advance.

Figure 2:
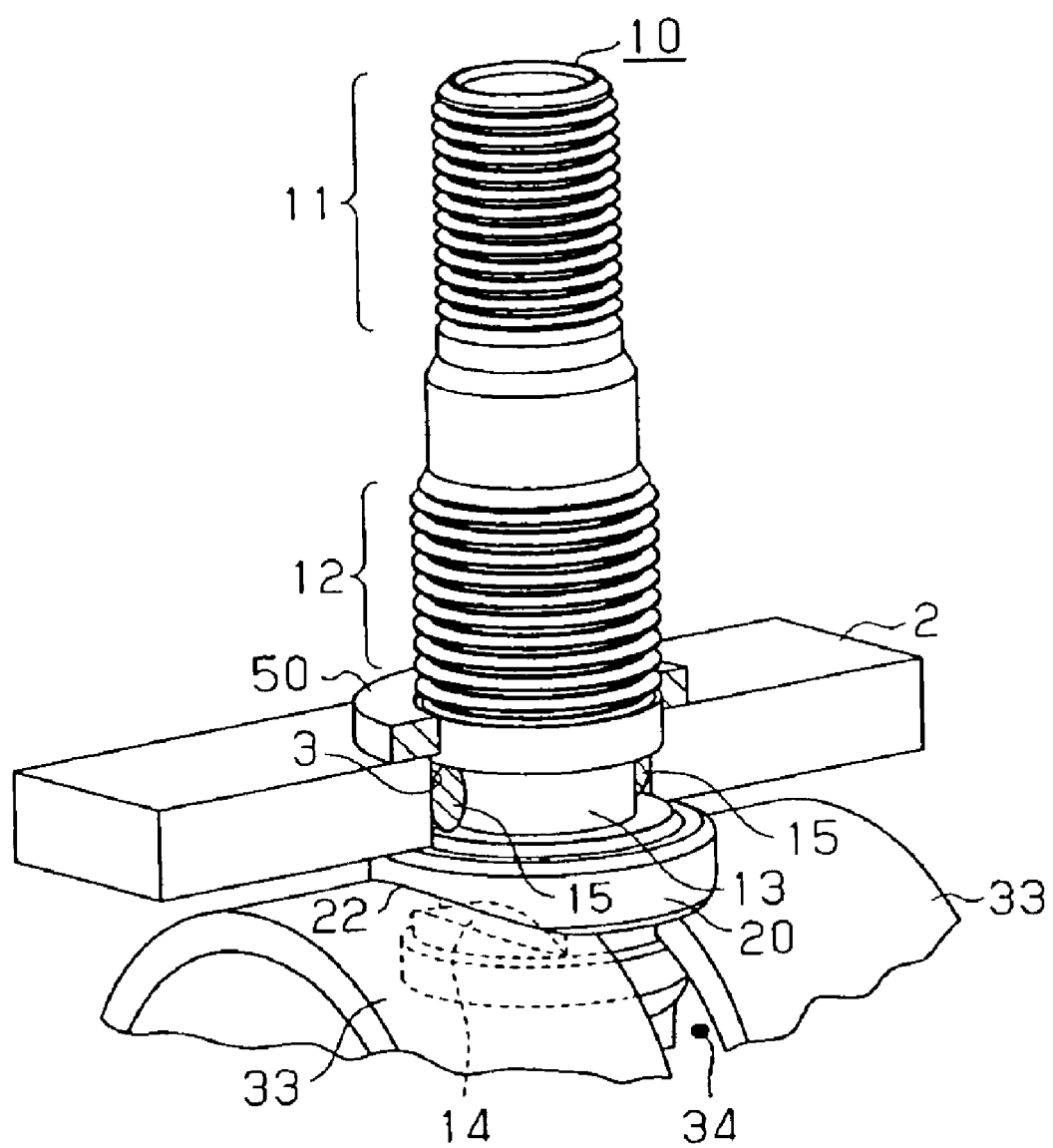
FIG. 2 is a partially cross-sectional perspective view illustrating the valve stem and the odd shaped washer attached to the housing member.

As shown in FIG. 2, an O ring 15 is engaged with the engaging groove 13 of the valve stem 10. The valve step 10 is fitted to the odd-shaped washer 20. The grooves 14 formed at a lower portion of the valve stem 10 are fitted to the projections 33 having an open end. That is, the groove 14 of the valve stem 10 is fitted to the projections 33 to arrange the valve stem 10 in the space 34. At this time, the odd-shaped washer 20 is arranged such that no gap is created between the arcuate recesses 22 formed at the lower side of the washer 20 and the projections 33.

Subsequently, the valve stem 10 is put through the valve hole 3 from the inside of the wheel 2 so that the O ring 15 engaged with the engaging groove 13 of the valve stem 10 to contact the valve hole 3. Also, the projecting edge 21 formed on the upper inside of the odd-shaped washer 20 contacts the valve hole 3. Accordingly, the O ring 15 is stopped in the valve hole 3 to ensure the airtightness of the tire.

Figure 3:
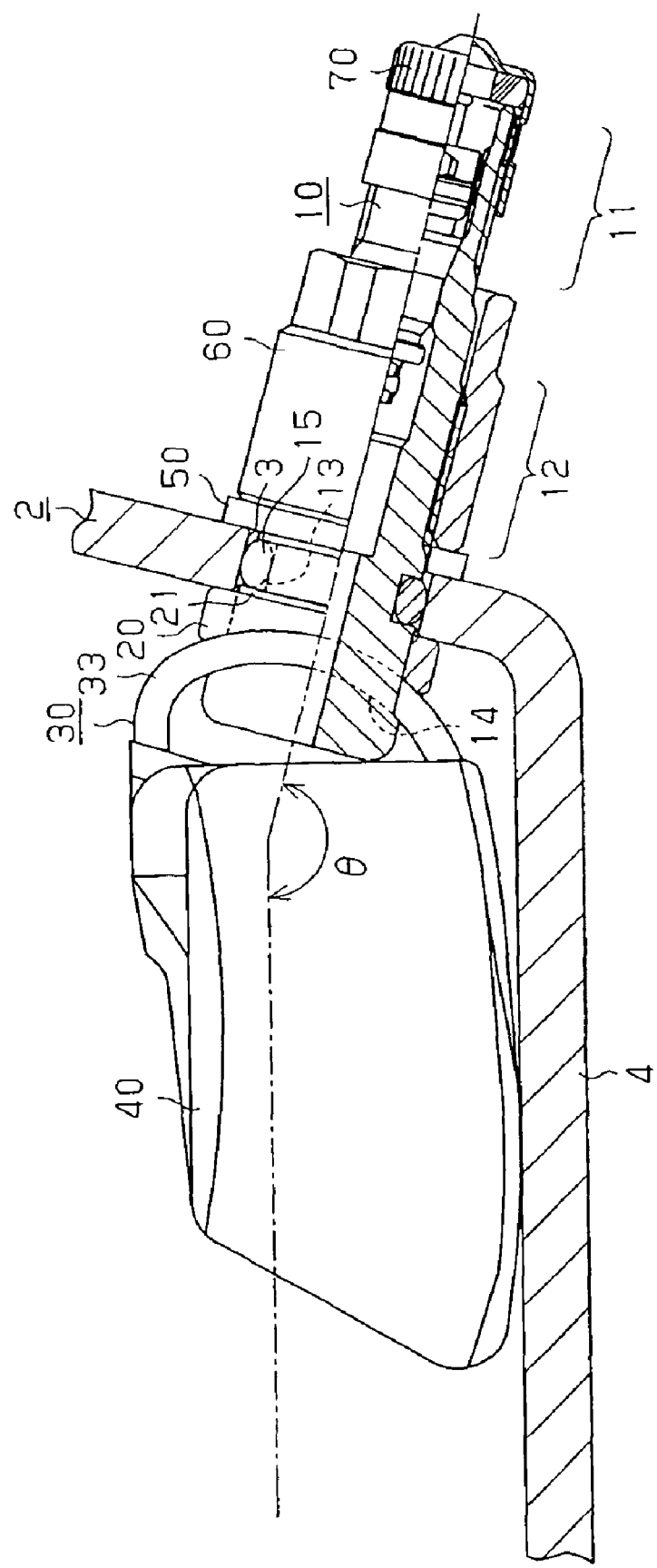
FIG. 3 is a partially cross-sectional view illustrating a valve for a transmitter in a tire condition monitoring apparatus attached to a wheel.

As shown in FIG. 3, when the casing 40 is pressed against the drop center 4 of the wheel 2, the projections 33 are moved along the arcuate grooves 14 of the valve stem 10. As a result, an installment angle θ defined by the valve stem 10 and the casing 40 is changed according to the cross-sectional shape of the wheel 2. In this state, the washer 50 is fitted to the valve stem 10 from the outside of the wheel 2. Then, a valve nut 60 is threaded to the fixing portion 12 of the valve stem 10 from the outside of the wheel 2.

When threading the valve nut 60, the grooves 14 of the valve stem 10 are engaged with the projections 33 of the housing portion 30. Further, the casing 40 is pressed against the drop center 4 of the wheel 2. Thus, when threading the valve nut 60, the valve stem 10 receives a force toward the outside of the wheel 2. As a result, the odd-shaped washer 20 is pressed by the wheel 2 and the housing portion 30. In other words, threading the valve nut 60 to the fixing portion 12 of the valve stem 10 determines the arrangement of the odd-shaped washer 20 relative to the housing portion 30. Accordingly, the position of the casing 40 is determined relative to the valve stem 10.

That is, the valve stem 10 is attached to the wheel 2 simply by threading the valve nut 60 to the fixing portion 12 of the valve stem 10. At the same time, the threading of the valve nut 60 determines the installment position of the casing 40. In this manner, the transmitter of the tire condition monitoring apparatus is attached to the wheel 2. Thereafter, a valve cap 70 is threaded to the cap receiving portion 11 to complete the installment of the transmitter of the tire condition monitoring apparatus.

This embodiment has the following advantages.

(1) The grooves 14 formed at a lower portion of the valve stem 10 are fitted to the projections 33 having an open end. That is, the valve stem 10 is arranged in the space 34 defined by the projections 33. Therefore, when the casing 40 is pressed against the drop center 4 of the wheel 2, the projections 33 are moved along the arcuate grooves 14 of the valve stem 10. As a result, an installment angle θ defined by the valve stem 10 and the casing 40 is changed according to the cross-sectional shape of the wheel 2. Thus, the transmitter of the tire condition monitoring apparatus can be installed in wheels 2 having various cross-sectional shapes.

(2) The valve stem 10 is attached to the wheel 2 simply by threading the valve nut 60 to the fixing portion 12 of the valve stem 10. At the same time, the threading of the valve nut 60 determines the installment position of the casing 40. Therefore, the transmitter for the tire condition monitoring apparatus is easily attached to the wheel 2. Further, by adjusting the fastening amount of the valve nut 60, the installment angle θ of the valve stem 10 and the casing 40 can be readjusted.

(3) Also, the transmitter for the tire condition monitoring apparatus may be removed from the wheel 2 and attached to a wheel having a different cross-sectional shape. That is, the present invention provides a highly versatile transmitter for tire condition monitoring apparatus.

(4) The transmitter for the tire condition monitoring apparatus is attached to the drop center 4 of the wheel 2. This prevents the beads of a tire from contacting the casing 40 when attaching the tire to the wheel 2. Therefore, unlike the prior art, a plurality of reinforcing triangular ribs need not be provided between the flange and the outer surface of the casing 40. It is needless to say that reinforcing ribs may be provided on the assumption that beads can contact the casing 40.

It should be apparent to those skilled in the art that the present invention may be embodied in many other specific forms without departing from the spirit or scope of the invention. Particularly, it should be understood that the invention may be embodied in the following forms.

In the illustrated embodiment, the O ring 15 is provided at the engaging groove 13 of the valve stem 10. However, instead of the O ring 15, a grommet may be provided at the engaging groove 13 of the valve stem 10.

The data representing the condition of the tire may include the pressure and the temperature of the tire.

The illustrated embodiment may be applied to any vehicle having tires. That is, the illustrated embodiment may be applied not only to four-wheel and two-wheel vehicles, but also to multi-wheel vehicles such as a bus and a truck.

In the illustrated embodiment, the arcuate grooves 14 of the valve stem 10 are engaged with the projections 33 of the housing portion 30. However, the valve stem 10 may have projections and the housing portion 30 may have arcuate grooves.

Therefore, the present examples and embodiments are to be considered as illustrative and not restrictive and the invention is not to be limited to the details given herein, but may be modified within the scope and equivalence of the appended claims.

What is claimed is:

1. A transmitter of an apparatus for monitoring a condition of a tire, the transmitter comprising:
    a valve stem for permitting flow of air into the tire, wherein a pair of grooves are formed in a proximal portion of the valve stem;
    an electronic element for transmitting a data representing the condition of the tire;
    a casing for accommodating the electronic element; and
    a coupler for coupling the valve stem to the casing such that an angle of the casing relative to the valve stem is adjustably controlled, wherein the coupler has a pair of projections, and the projections fit into the grooves.

2. The transmitter according to claim 1, wherein each projection is movable along the corresponding groove.

3. The transmitter according to claim 1, wherein the projections are arcuate.

4. The transmitter according to claim 1, wherein the projections extend from the casing, wherein the projections extend parallel to each other to define a space between the adjacent projections, and wherein a part of the valve stem between the grooves is fitted into the space.

5. The transmitter according to claim 1, further comprising a valve nut threaded to the valve stem to attach the valve stem to a wheel, wherein the angle of the casing is fixed by fastening the valve nut.

6. A transmitter of an apparatus for monitoring a condition of a tire, the transmitter comprising:
    a valve stem for permitting flow of air into the tire, wherein a pair of grooves are formed in a proximal portion of the valve stem;
    an electronic element for transmitting a data representing the condition of the tire;
    a casing for accommodating the electronic element; and
    a coupler for coupling the valve stem to the casing such that an angle of an attachment of the casing relative to the valve stem is adjustably controlled, wherein the coupler is fixed to the casing, wherein the coupler has a pair of arcuate projections, and wherein the projections are fitted into the grooves such that each projection is movable along the corresponding groove.

7. The transmitter according to claim 6, wherein the projections extend from the casing, wherein the projections extend parallel to each other to define a space between the adjacent projections, and wherein a part of the valve stem between the grooves is fitted into the space.

8. The transmitter according to claim 6, further comprising a valve nut threaded to the valve stem to attach the valve stem to a wheel, wherein the angle of the casing is fixed by fastening the valve nut.

9. The transmitter according to claim 8, wherein, when the valve nut is loosened, the casing and the coupler is movable relative to the valve stem.

* * * * *